United States Patent
Ulmer et al.

(10) Patent No.: US 10,445,270 B2
(45) Date of Patent: Oct. 15, 2019

(54) CONFIGURING OPTIMAL BUS TURNAROUND CYCLES FOR MASTER-DRIVEN SERIAL BUSES

(71) Applicant: QUALCOMM Incorporated, San Diego, CA (US)

(72) Inventors: Elisha Ulmer, Kfar Baruch (IL); Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/994,754

(22) Filed: May 31, 2018

(65) Prior Publication Data

US 2018/0357194 A1    Dec. 13, 2018

Related U.S. Application Data

(60) Provisional application No. 62/517,713, filed on Jun. 9, 2017.

(51) Int. Cl.
G06F 13/42   (2006.01)
G06F 3/06    (2006.01)
G06F 13/362  (2006.01)

(52) U.S. Cl.
CPC ...... *G06F 13/3625* (2013.01); *G06F 13/4291* (2013.01)

(58) Field of Classification Search
None
See application file for complete search history.

(56) References Cited

U.S. PATENT DOCUMENTS

| 5,640,518 | A    | 6/1997  | Muhich et al.         |
| 6,304,895 | B1 * | 10/2001 | Schneider ... G06F 3/023 709/203 |
| 6,581,017 | B2   | 6/2003  | Zumkehr               |
| 7,042,914 | B2   | 5/2006  | Zerbe et al.          |
| 9,110,828 | B2   | 8/2015  | Horowitz et al.       |

(Continued)

OTHER PUBLICATIONS

International Search Report and Written Opinion—PCT/US2018/035637—ISA/EPO—dated Sep. 17, 2018.

(Continued)

*Primary Examiner* — Hyun Nam
(74) *Attorney, Agent, or Firm* — Loza & Loza LLP

(57) ABSTRACT

Systems, methods, and apparatus for optimizing bus turnaround in a master-driven serial bus are described. A method performed at a master device coupled to a serial bus includes configuring slave devices coupled to the serial bus with respective delay values that define bus turnaround wait periods, transmitting a first read command directed to a first slave device, receiving data after a first wait period initiated after the first read command has been sent, the first wait period being defined by a delay value configured in the first slave device, transmitting a second read command directed to a second slave device, and receiving data after a second wait period initiated after the second read command has been sent, the second wait period being defined by a delay value configured in the second slave device. The first wait period and the second wait period may have different durations.

30 Claims, 13 Drawing Sheets

(56) References Cited

U.S. PATENT DOCUMENTS

| | | |
|---|---|---|
| 9,520,865 B2 | 12/2016 | Amarilio et al. |
| 9,660,656 B2 | 5/2017 | Subramanian et al. |
| 2016/0124896 A1* | 5/2016 | Pitigoi-Aron ....... H04L 25/4923 710/110 |
| 2016/0147684 A1 | 5/2016 | Sengoku et al. |
| 2017/0116150 A1 | 4/2017 | Wiley |

OTHER PUBLICATIONS

Srivastava A.M., "Specification for I3C—Improved Inter Integrated Circuit—Version 1.0—Public Release Edition", Dec. 23, 2016 (Dec. 23, 2016), 197 Pages, XP055504463, Retrieved from the Internet: URL: https://cdn2.hubspot.net/hubfs/2384176/public-specifications/mipi_I3C_specification_v1-0_public_edition.pdf?utm_campaign=I3C%20v1.0%20Download&utm_medium=email&hsenc=p2ANqtz-9ktG3MvcF8KaQXcGuMpHFtJ_rtj45SfOVZmDilAKEpZwEI4CxQgERB1S0xsNU-NzB_p6uDw7HU5Ra0nqvkKEhOdwIGBo9K5MpsZEubX39ah348Gbl&_hsmi=2&utm [retrieved on Sep. 4, 2018].

\* cited by examiner

CONFIGURING OPTIMAL BUS TURNAROUND CYCLES FOR MASTER-DRIVEN SERIAL BUSES

PRIORITY CLAIM

This application claims priority to and the benefit of U.S. Provisional Patent Application Ser. No. 62/517,713 filed in the U.S. Patent Office on Jun. 9, 2017, the entire content of this application being incorporated herein by reference as if fully set forth below in its entirety and for all applicable purposes.

TECHNICAL FIELD

The present disclosure relates generally to serial communication and input/output pin configuration and, more particularly, to optimizing a finite state machine configured for optimal latency for serial messaging and input/output pin configuration.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bur or a parallel bus. General-purpose serial interfaces known in the industry include the Inter-Integrated Circuit (I2C or I²C) serial bus and its derivatives and alternatives, including interfaces defined by the Mobile Industry Processor Interface (MIPI) Alliance, such as the I3C interface, the System Power Management Interface (SPMI) interface, and the Radio Frequency Front-End (RFFE) interface.

In one example, the I2C serial bus is a serial single-ended computer bus that was intended for use in connecting low-speed peripherals to a processor. Some interfaces provide multi-master busses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links.

In many instances, communication between an application processor and multiple peripherals over a common bus is limited by the slowest peripheral. In one example, I3C devices may have faster interfaces and/or processing capabilities than legacy I2C devices coupled to the same serial bus. As mobile communication devices continue to include a greater level of functionality, improved serial communication techniques are needed to optimize communication between peripherals and application processors.

SUMMARY

Certain aspects of the disclosure relate to systems, apparatus, methods and techniques that can provide optimized bus turnaround in a master-driven serial bus.

In various aspects of the disclosure, a method performed at a master device coupled to a serial bus includes configuring a plurality of slave devices coupled to the serial bus with respective delay values that define wait periods between changes in direction of transmissions over the serial bus, transmitting a first read command directed to a first slave device, receiving data responsive to the first read command after a first wait period initiated after the first read command has been sent, the first wait period being defined by a delay value configured in the first slave device, transmitting a second read command directed to a second slave device, and receiving data responsive to the first read command after a second wait period initiated after the second read command has been sent, the second wait period being defined by a delay value configured in the second slave device. The first wait period and the second wait period may have different durations.

In some aspects, the method includes transmitting first data to a register in a third slave device, initializing a first delay value, repeating a test procedure until the first data is correctly read from the third slave device. The test procedure may include transmitting the first delay value to the third slave device, transmitting a third read command addressed to the register in the third slave device, and increasing the first delay value when the first data is not correctly read from the third slave device. The third slave device may be configured to use the first delay value to define wait periods between changes in direction of transmissions over the serial bus. The first delay value may be used to define changes in direction of transmissions over the serial bus when the serial bus is operated in a first mode for communication with the third slave device.

In some aspects, the method may include transmitting second data to a register in a third slave device, initializing a second delay value, repeating a test procedure until the second data is correctly read from the third slave device. The test procedure may include transmitting the second delay value to the third slave device, transmitting the third read command addressed to the register in the third slave device, and increasing the second delay value when the second data is not correctly read from the third slave device. The third slave device may be configured to use the second delay value to define wait periods between changes in direction of transmissions over the serial bus. The second delay value may be used to define changes in direction of transmissions over the serial bus when the serial bus is operated in a first mode for communication with the third slave device. The serial bus may be operated in the second mode when frequency of a clock signal is changed. Occurrence of a change in mode of operation of the serial bus may be determined by identifying a variation in process, voltage and temperature (PVT) characteristics affecting the third slave device.

In one or more aspects, the first delay value is stored in a table of delay values that includes delay values indexed by process, voltage and/or temperature. The first delay value may be stored in a table of delay values that includes delay values indexed by frequency. The first delay value may be stored in a table of delay values that includes delay values indexed by slave device.

According to various aspects of the disclosure, a processor-readable storage medium has one or more instructions which, when executed by at least one processor or state machine of a processing circuit, cause the processing circuit to configure a plurality of slave devices coupled to a serial bus with respective delay values that define wait periods between changes in direction of transmissions over the serial bus, transmit a first read command directed to a first slave device, receive data responsive to the first read command after a first wait period initiated after the first read command has been sent, the first wait period being defined by a delay value configured in the first slave device, transmit a second read command directed to a second slave device, and receive data responsive to the second read command after a second wait period initiated after the second read command has been sent, the second wait period being defined by a delay value configured in the second slave device. The first wait period and the second wait period may have different durations.

In certain aspects, the instructions cause the processing circuit to transmit first data to a register in a third slave device, initialize a first delay value, repeat, until the first data is correctly read from the third slave device, transmit the first delay value to the third slave device, transmit a third read command addressed to the register in the third slave device, increase the first delay value when the first data is not correctly read from the third slave device, use the first delay value to define a third wait period associated with changes in direction of transmissions over the serial bus when the serial bus is operated in a first mode for communication with the third slave device. The third slave device may be configured to use the first delay value to define wait periods between changes in direction of transmissions over the serial bus.

In certain aspects, the instructions cause the processing circuit to determine occurrence of a change in mode of operation of the serial bus, transmit second data to a register in the third slave device, initialize a second delay value and, until the second data is correctly read from the third slave device, repetitively transmit the second delay value to the third slave device to be used by the third slave device to define wait periods between changes in direction of transmissions over the serial bus. The third read command may be transmitted on the serial bus and the second delay value may be increased when the second data is not correctly read from the third slave device. The second delay value may be used to define a fourth wait period associated with changes in direction of transmissions over the serial bus when the serial bus is operated in a second mode for communication with the third slave device. The serial bus may be operated in the second mode when frequency of a clock signal is changed or when a variation in process, voltage and temperature (PVT) characteristics affecting the third slave device is identified.

In various aspects of the disclosure, an apparatus includes means for configuring a plurality of slave devices coupled to a serial bus with respective delay values that define wait periods between changes in direction of transmissions over the serial bus, means for transmitting commands on the serial bus, the means for transmitting commands being configured to transmit a first read command directed to a first slave device, and means for receiving data from the serial bus, the means for receiving data being configured to receive data responsive to the first read command after a first wait period initiated after the first read command has been sent, the first wait period being defined by a delay value configured in the first slave device. The means for transmitting commands may be configured to transmit a second read command directed to a second slave device. The means for receiving data may be configured to receive data responsive to the second read command after a second wait period initiated after the second read command has been sent, the second wait period being defined by a delay value configured in the second slave device. The first wait period and the second wait period may have different durations.

In one aspect, the means for determining delay values configured to determine a first delay value operable to define a third wait period associated with changes in direction of transmissions over the serial bus when the serial bus is operated in a first mode for communication with a third slave device. The means for determining delay values may be configured to transmit first data to a register in the third slave device, initialize a first delay value and, until the first data is correctly read from the third slave device, repetitively transmit the first delay value to the third slave device to be used by the third slave device to define wait periods between changes in direction of transmissions over the serial bus, transmit a third read command addressed to the register in the third slave device, and increase the first delay value when the first data is not correctly read from the third slave device.

In one aspect, the means for determining delay values is configured to determine a second delay value operable to define a third wait period associated with changes in direction of transmissions over the serial bus when the serial bus is operated in a second mode for communication with the third slave device by determining occurrence of a change in mode of operation of the serial bus, transmitting second data to a register in the third slave device, initializing a second delay value and, until the second data is correctly read from the third slave device, repetitively transmit the second delay value to the third slave device to be used to define wait periods between changes in direction of transmissions over the serial bus, transmit the third read command on the serial bus, and increase the second delay value when the second data is not correctly read from the third slave device.

In various aspects of the disclosure, a bus master has a bus interface that couples the bus master to a multi-drop bus, a storage device configured with a look-up table that maintains one or more bus turnaround delay values for each of a plurality of slave devices coupled to the multi-drop bus, and a controller. The controller may be adapted to configure each of the plurality of slave devices with respective one or more bus turnaround delay values maintained in the storage device, where the bus turnaround delay values define a wait period between changes in direction of transmissions over the multi-drop bus. The controller may be adapted to transmit a first read command directed to a first slave device, receive data responsive to the first read command after a first wait period initiated after the first read command has been sent, the first wait period being defined by a first turnaround delay value configured in the first slave device, transmit a second read command directed to a second slave device and receive data responsive to the second read command after a second wait period initiated after the second read command has been sent, the second wait period being defined by a second turnaround delay value configured in the second slave device. The first wait period and the second wait period may have different durations.

In certain aspects, the controller is configured to transmit first data to a register in a third slave device, initialize a first delay value. Until the first data is correctly read from the third slave device, the controller may be configured to repetitively transmit the first delay value to the third slave device to be used by the third slave device to define wait periods between changes in direction of transmissions over the multi-drop bus, transmit a third read command addressed to the register in the third slave device, and increase the first delay value when the first data is not correctly read from the third slave device.

In certain aspects, the controller is configured to determine occurrence of a change in mode of operation of the multi-drop bus, transmit second data to a register in the third slave device and initialize a second delay value. Until the second data is correctly read from the third slave device, the controller may transmit the second delay value to the third slave device to be used to define wait periods between changes in direction of transmissions over the multi-drop bus, transmit the third read command on the multi-drop bus, and increase the second delay value when the second data is not correctly read from the third slave device.

DETAILED DESCRIPTION

Figure 1:
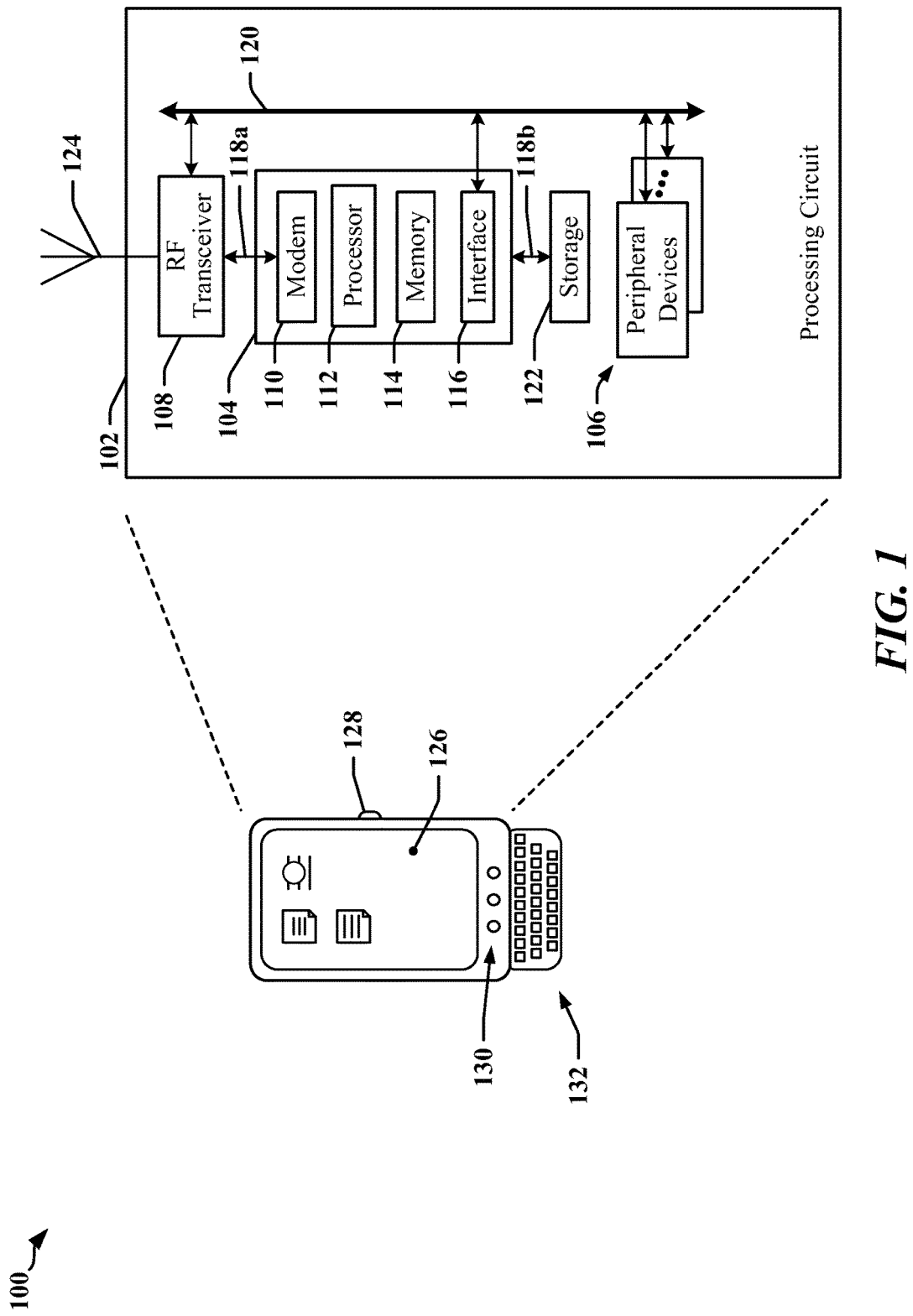
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance I2C, I3C, SPMI, and/or RFFE protocols.

According to certain aspects disclosed herein, bus turnaround may be optimized in a master-driven serial bus. Bus turnaround occurs when a first device ceases driving one or more wires of a multi-drop bus such that a second device, which is often the device that had been receiving data from the first device, begins driving the one or more wires that were released by the first device. During bus turnaround, both devices change mode of operation of line interface circuits. A line driver of the previously-transmitting first device is placed in a high-impedance or open-drain mode, and the first device may enable and/or configure a receiver circuit of its interface to enable reception of data and/or clock signals from the multi-drop bus. A line driver of the previously-receiving second device may be placed in an active mode that permits the second device to transmit data and/or clock signals on the multi-drop bus, and the first device may disable and/or configure a receiver circuit of its interface to disable reception of data and/or clock signals from the multi-drop bus.

Some interfaces use push-pull drivers to transmit on wires the multi-drop bus and it is necessary or desirable that the push-pull drivers are disabled or disconnected from the wires before another device begins transmitting on those wires. A bus turnaround period may be defined by protocols governing communication over a multi-drop bus. A device that has been transmitting can disable its line drivers and/or cause its line drivers to enter a high-impedance mode as the bus turnaround period commences. A device that has been receiving may enable its line drivers such that it is ready to begin transmission at the end of the bus turnaround period. Typically, one or more wires of the multi-drop bus is undriven for some portion of the bus turnaround period. The duration of the bus turnaround period is typically defined as a minimum duration of time sufficient to allow devices with the slowest bus turnaround characteristic to transition from transmitter to receiver, or from receiver to transmitter, for example. Throughput and bus latency of the multi-drop bus may be limited by the device with the slowest bus turnaround characteristic that is coupled to the multi-drop bus, or that could be coupled to the multi-drop bus. High-performing devices may be hampered by a defined minimum bus turnaround period.

According to certain aspects disclosed herein, a minimum bus turnaround period may be configured for each device coupled to a multi-drop bus such that a master device or other transmitter may determine the minimum bus turnaround period based on the identity of devices participating in a transaction over the multi-drop bus. In some implementations, a table of minimum bus turnaround periods may be maintained for each device to identify a minimum bus turnaround period for different PVT conditions.

In one example, a master device coupled to a multi-drop bus may configure slave devices coupled to the multi-drop with one or more respective delay values that define bus turnaround wait periods. Delay values may be defined for certain devices under different operating conditions, including different PVT conditions. The master device may determine or learn the delay values by writing and immediately interrogating registers in one or more slave devices using a series of incrementally increasing bus turnaround periods until the register is successfully read after a bus turnaround. In one example, the master device may write a value to a register in a slave device. The master device may commence a repetitive cycle that includes transmitting a read command directed to the register in the slave device and receiving data after a bus turnaround period that is initiated after the read command has been sent. The cycle is terminated when the register contents is correctly read from the slave device. When the register contents are incorrectly read from the slave device, the master device may increase the bus turnaround period and perform another read cycle. The multi-drop may be a serial bus operated in accordance with I2C, I3C, SPMI, and/or RFFE protocols or other protocol that defines bus turnaround procedures.

Examples of Apparatus that Employ Serial Data Links

According to certain aspects, turnaround wait periods may be defined for individual devices coupled to a serial bus. The serial bus may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
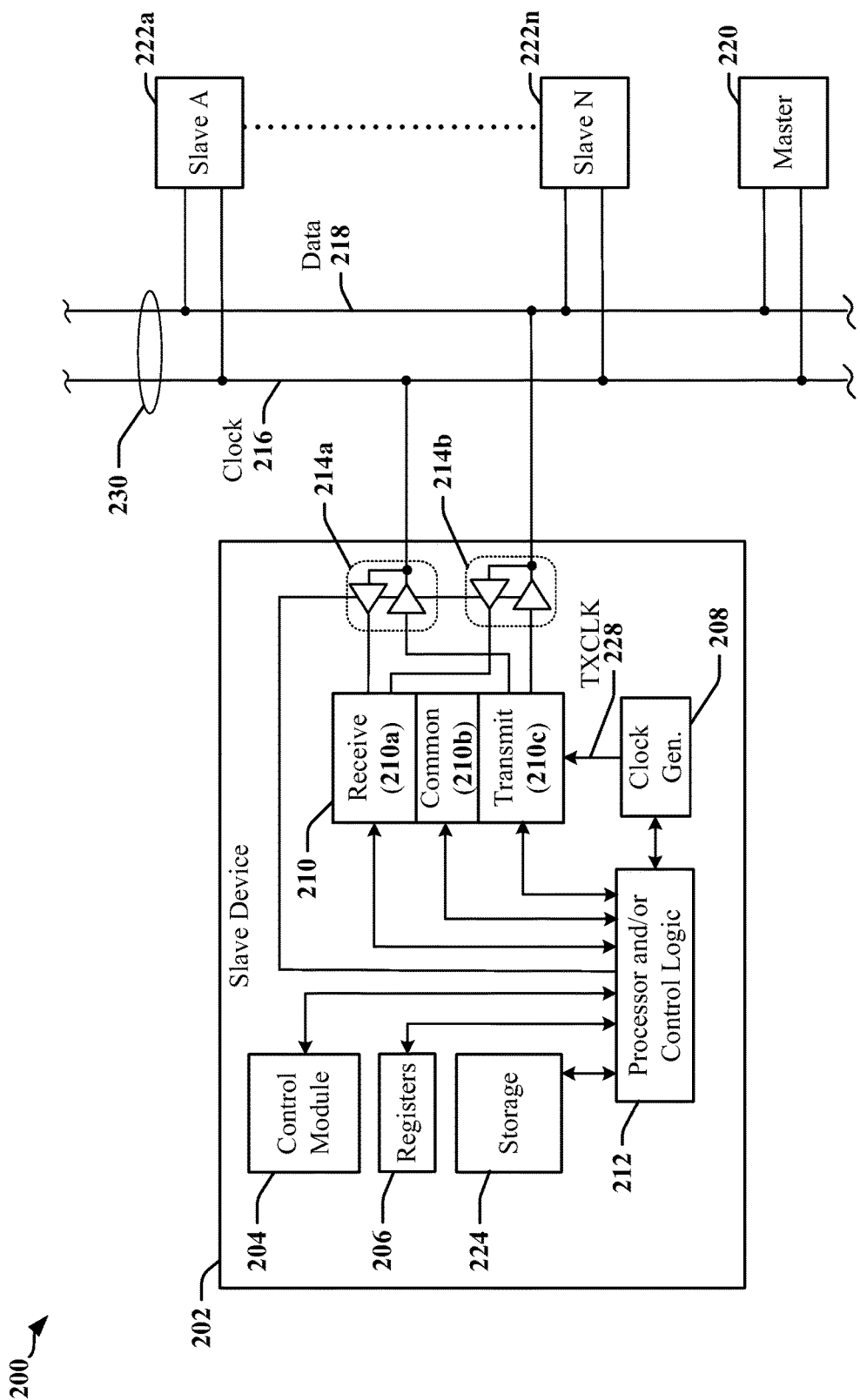
FIG. 2 illustrates a system architecture for an apparatus employing a data link between IC devices.

FIG. 2 illustrates certain aspects of an apparatus 200 that includes multiple devices 202, 220 and 222a-222n connected to a serial bus 230. The devices 202, 220 and 222a-222n may include one or more semiconductor IC devices, such as an applications processor, SoC or ASIC. Each of the devices 202, 220 and 222a-222n may include, support or operate as a modem, a signal processing device, a display driver, a camera, a user interface, a sensor, a sensor controller, a media player, a transceiver, and/or other such components or devices. Communications between devices 202, 220 and 222a-222n over the serial bus 230 is controlled by a bus master 220. Certain types of bus can support multiple bus masters 220.

The apparatus 200 may include multiple devices 202, 220 and 222a-222n that communicate when the serial bus 230 is operated in accordance with I2C, I3C or other protocols. At least one device 202, 222a-222n may be configured to operate as a slave device on the serial bus 230. In one example, a slave device 202 may be adapted to provide a control function 204. In some examples, the control function 204 may include circuits and modules that support a display, an image sensor, and/or circuits and modules that control and communicate with one or more sensors that measure environmental conditions. The slave device 202 may include configuration registers 206 or other storage 224, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing in one or more signals 228 provided by a clock generation circuit 208.

Two or more of the devices 202, 220 and/or 222a-222n may be adapted according to certain aspects and features disclosed herein to support a plurality of different communication protocols over a common bus, which may include an I2C and/or I3C protocol. In some instances, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230. In some examples, a 2-wire serial bus 230 transmits data on a first wire 218 and a clock signal on a second wire 216. In some instances, data may be encoded in the signaling state, or transitions in signaling state of the first wire 218 and the second wire 216.

Figure 3:
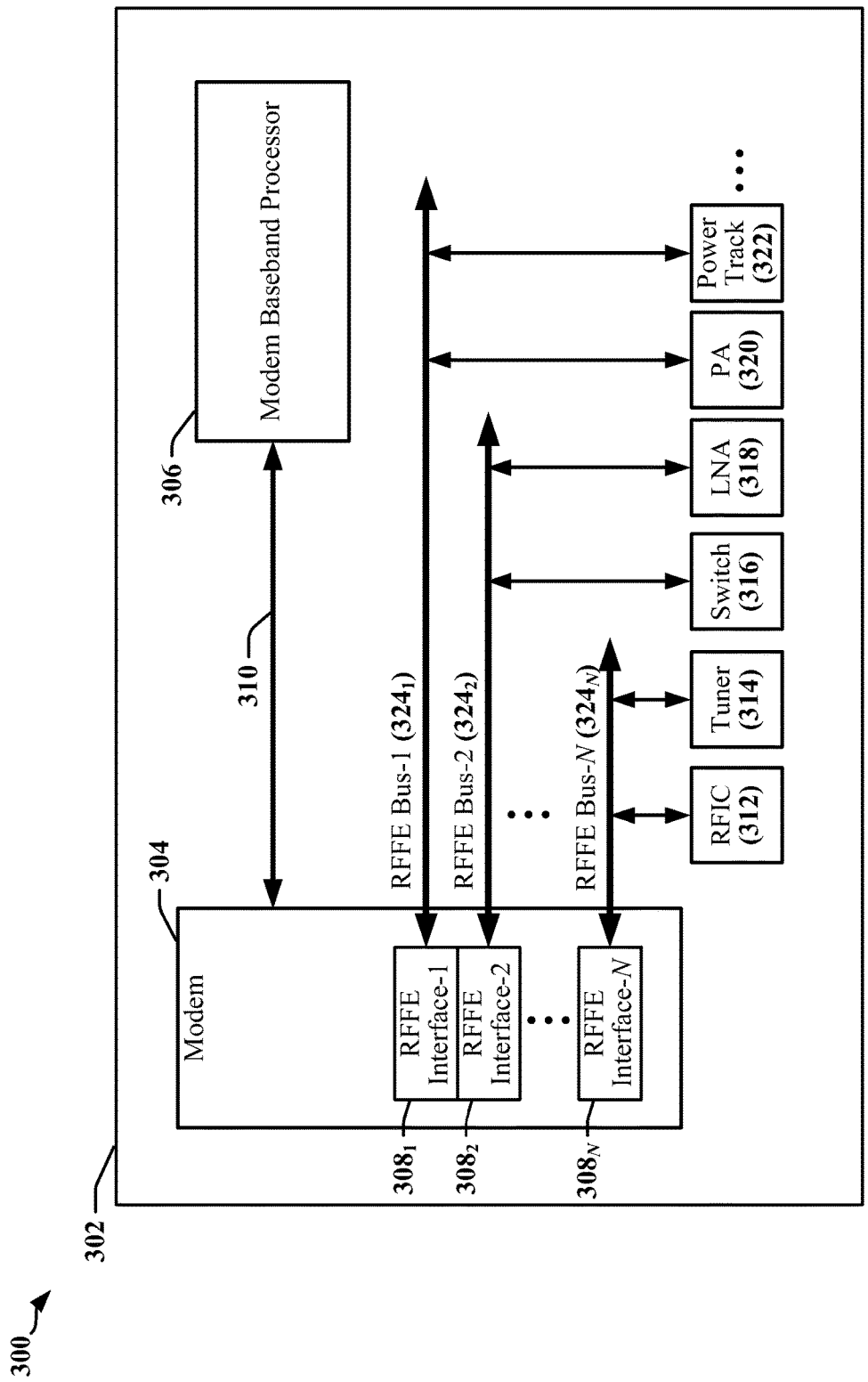
FIG. 3 illustrates a device that employs an RFFE bus to couple various radio frequency front-end devices.

FIG. 3 illustrates a system 300 that includes a multiple RFFE buses $324_1$-$324_N$ provided in a chipset or device 302. The multiple RFFE buses $324_1$-$324_N$ may couple various combinations of front-end devices 312, 314, 316, 318, 320, 322 to a modem 304. The modem 304 may include one or more RFFE interfaces $308_1$-$308_N$, each of which couples the modem 304 to a corresponding RFFE bus $324_1$-$324_N$. The modem 304 may communicate with a baseband processor 306 through a separate, dedicated and/or shared communication link 310. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 302 may be implemented with more than one baseband processors 306, modems 304, and/or other types of buses in addition to the communications links 310, $324_1$-$324_N$. The device 302 may include other processors, circuits, controllers, state machines, modules and may be configured for various operations and/or different functionalities.

In the example illustrated in FIG. 3, one RFFE bus $324_N$ is coupled to an RF integrated circuit (RFIC 312) and an RF tuner 314. The RFIC 312 may include one or more controllers, state machines and/or processors that configure and control certain aspects of the RF front-end. Another RFFE bus $324_2$ may couple the modem 304 to a switch 316 and an LNA 318. The LNA 318 may be a radio frequency amplifier that is provided noise amplifier (LNA) to increase signal strength of RF signals before to improve receiver sensitivity and/or to compensate for loss attributable to the signal path between antenna and receiver. Another RFFE bus $324_1$ may couple the modem 304 to a power amplifier (PA 320) and a power tracking module 322. Other types of devices may be coupled by one or more of the RFFE buses $324_1$-$324_N$, and other assignments and allocations of devices 312, 314, 316, 318, 320, 322 to RFFE buses $324_1$-$324_N$ may be configured according to application needs.

The system 300 may include multiple instances of certain device types (e.g. switch 316, LNA 318, PA 320 and other types of device) that may operate concurrently in a manner that can generate inter-device interference, or that could potentially cause damage to one or more devices. Devices that may be interfere with one another may exchange coexistence management (C×M) messages to permit each device to signal imminent actions that may result in interference or conflict. C×M messages may be used to manage operation of shared components including a switch 316, an LNA 318, a PA 320 and/or an antenna. C×M messages are typically high-priority, real time messages that are intended for transmission with minimum latency.

Figure 4:
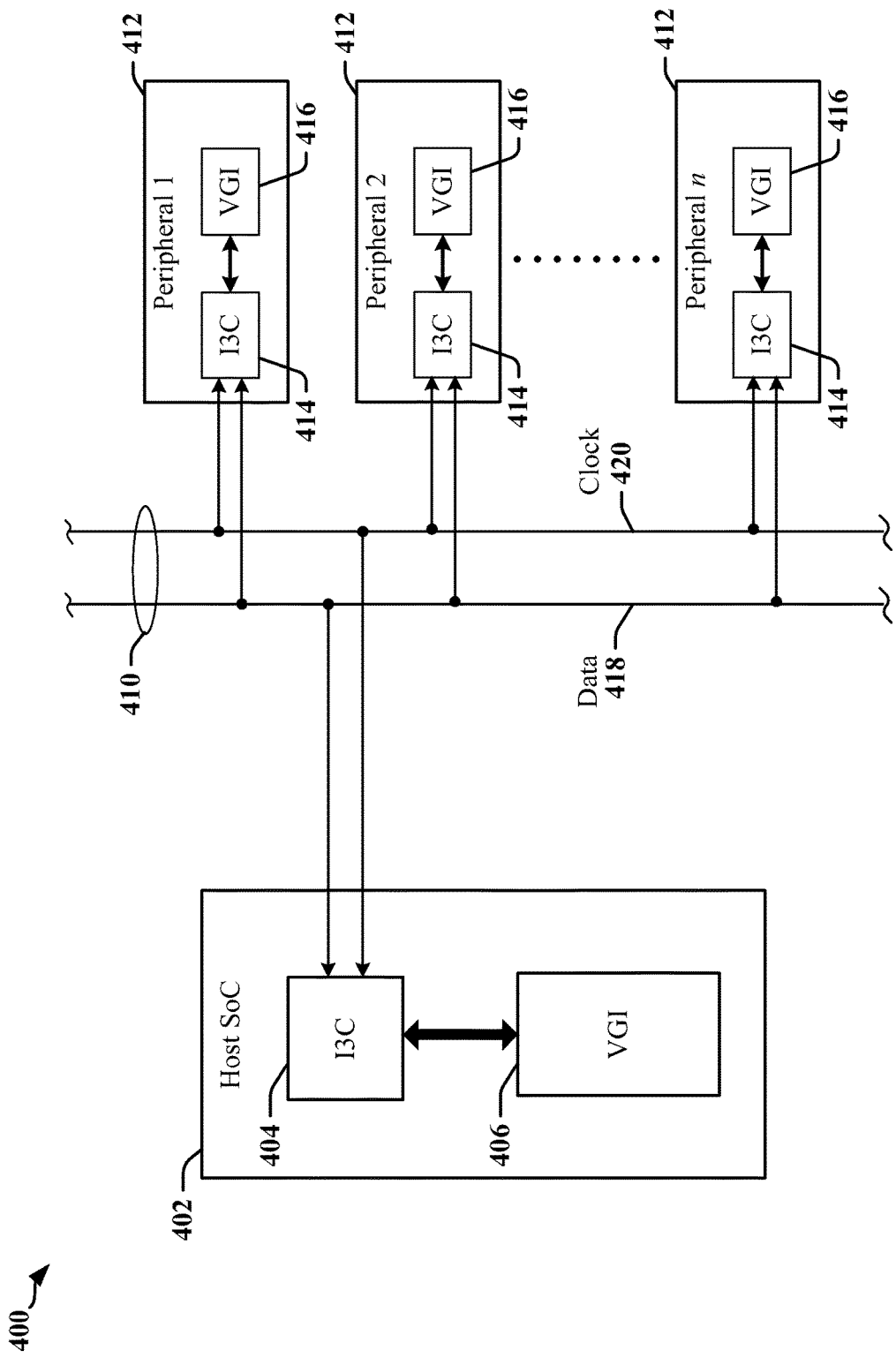
FIG. 4 illustrates a device that employs an I3C bus to couple various front-end devices in accordance with certain aspects disclosed herein.

FIG. 4 illustrates an example of an apparatus 400 that uses an I3C bus to couple various devices including a host SoC 402 and a number of peripheral devices 412. The host SoC 402 may include a virtual general-purpose (GPIO) finite state machine (VGI FSM 406) and an I3C interface 404, where the I3C interface 404 cooperates with corresponding I3C interfaces 414 in the peripheral devices 412 to provide a communication link between the host SoC 402 and the peripheral devices 412. Each peripheral device 412 includes a VGI FSM 416. In the illustrated example, communications between the SoC 402 and a peripheral device 412 may be serialized and transmitted over a multi-wire serial bus 410 in accordance with an I3C protocol.

The VGI FSMs 406, 416 may be configured to convert physical GPIO state to digital representations of GPIO state that can be transmitted over the multi-wire serial bus 410 in virtual GPIO messages. The messages can be generated for transmission in accordance with I3C protocols, for example. The VGI FSMs 406, 416 may be further configured to convert virtual GPIO messages received from the multi-wire serial bus 410 to physical GPIO state. Virtual GPIO messages can eliminate or reduce the need for certain physical interconnections between devices 402, 412 by exchanging state information and/or state change information over a multi-wire serial bus 410. Virtual GPIO messages are typically high-priority, real time messages that are intended for transmission with minimum latency.

In other examples, the host SoC 402 may include other types of interface, including I2C, SPMI and/or RFFE interfaces. In other examples, the host SoC 402 may include a configurable interface that may be employed to communicate using I2C, I3C, SPMI, RFFE, and/or another suitable protocol. In some examples, a multi-wire serial bus 410, such as an I2C or I3C bus, may transmit a data signal over a data wire 418 and a clock signal over a clock wire 420.

The MIPI Alliance SPMI specifies a hardware interface that may be implemented between baseband or application processors and peripheral components to support power management operations. In one example, a two-wire serial interface operated in accordance with SPMI protocols may be used to connect integrated power controller of a SoC processor system with a power management integrated circuit (PMIC) voltage regulation system. The interface can be used to accurately monitor and control processor performance levels required for a given workload or application and dynamically control the various supply voltages in real time based on the performance levels. The serial interface can be optimized for real-time control of power management and other devices when configured in accordance with SPMI protocols as a shared bus that provides high-speed, low-latency connection for devices, where data transmissions may be managed, according to priorities assigned to different traffic classes.

Figure 5:
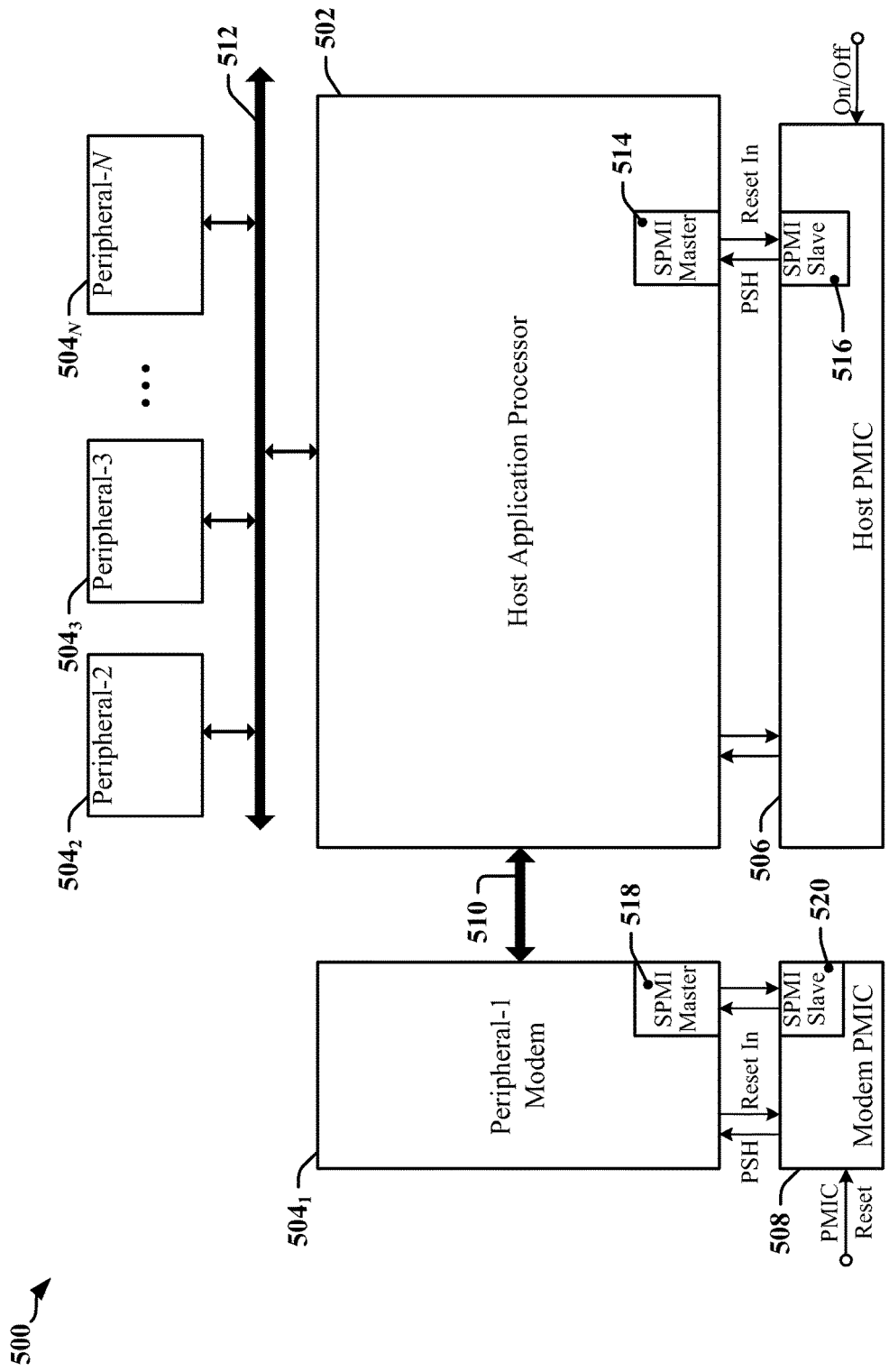
FIG. 5 illustrates an example of communication links that may be adapted according to certain aspects disclosed herein.

FIG. 5 illustrates an example of a system 500 which includes communication links, including SPMI links. The system 500 may include an application processor 502 that may serve as a host device on various communication links, multiple peripherals $504_1$-$504_N$, and one or more PMICs 506, 508. In the illustrated system 500, at least a first peripheral $504_1$ may include a modem. The application processor 502 and the first peripheral $504_1$ may be coupled to respective PMICs 506, 508 using power management interfaces implemented using SPMI masters 514, 518. The SPMI masters 514, 518 communicate with corresponding SPMI slaves 516, 520 provided in the PMICs 506, 508. SPMI provides for real-time control of the PMICs 506, 508. The application processor 502 may be coupled to each of the peripherals $504_1$-$504_N$ using different types of communication links 510, 512. For example, the communication links 510, 512 may be operated in accordance with protocols such as the RFFE, SPMI, I3C protocols. An SPMI interface may be capable of communicating high-priority, real time messages that are intended for transmission with minimum latency.

Bus Turnaround in Master-Driven Serial Buses

Mobile communication devices, and other devices that are related or connected to mobile communication devices, increasingly provide greater capabilities, performance and functionalities. In many instances, a mobile communication device incorporates multiple IC devices that are connected using one or more shared communication links. Typically, a shared communication link is operated in a manner that enables the least capable devices to interoperate with more capable devices. In one example, frequencies of clock signals that control data transfer rates may be selected based on the capabilities of a slowest slave device at the expense of reduced throughput between slave and master devices that can operate at higher clock frequencies. In another example, high-performing devices may be limited by a minimum bus turnaround period defined based on the need of slower devices.

Figure 6:
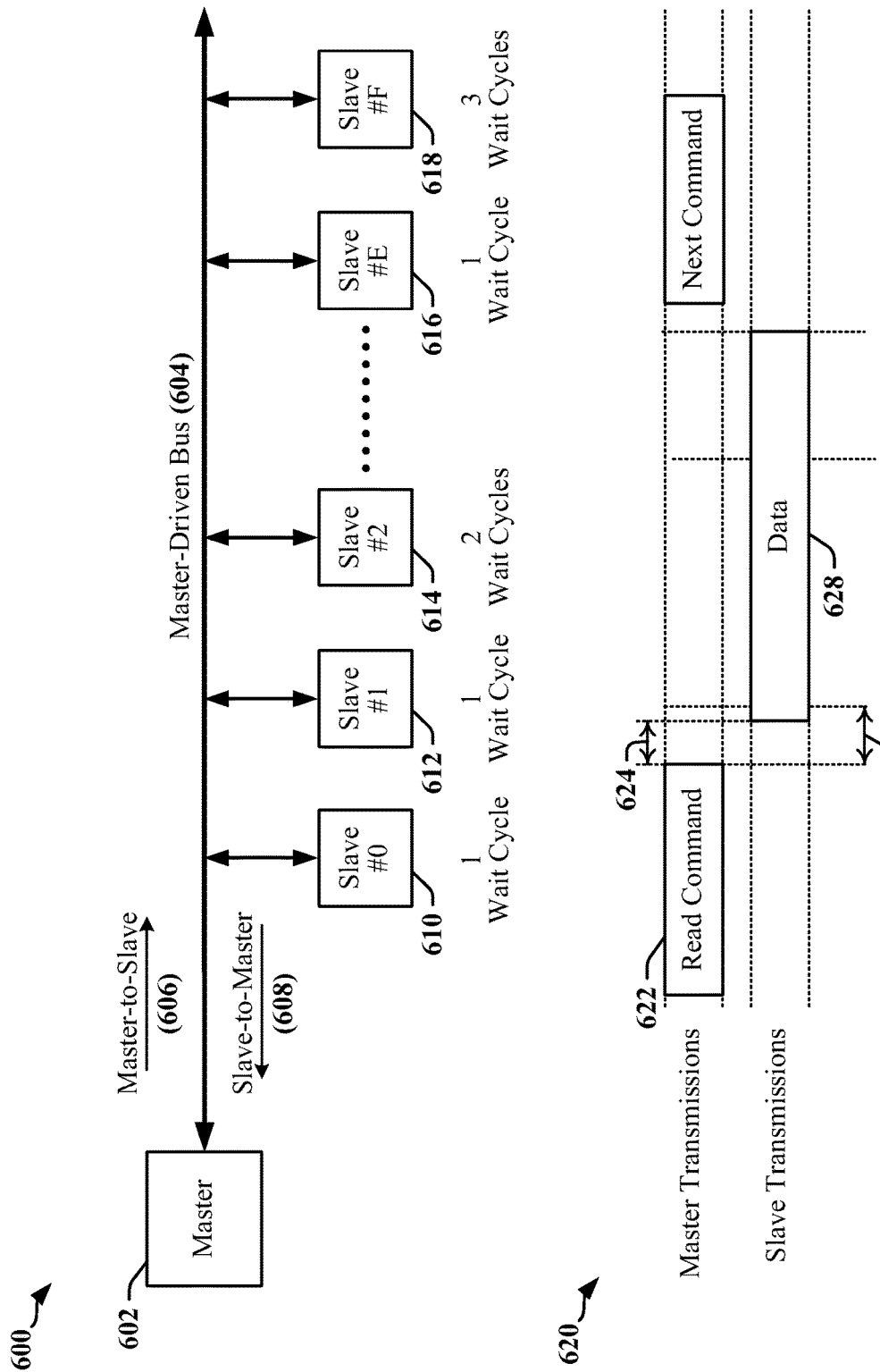
FIG. 6 illustrates a system that includes a master-driven serial bus that may be adapted according to certain aspects disclosed herein.

FIG. 6 illustrates a system 600 that includes a master-driven serial bus 604. Master-driven serial bus architectures include bus architectures based on RFFE and SPMI protocols, where bus operations may be initiated and controlled by a master device 602. The timing diagram 620 relates to a Register-Read operation. The master device 602 may issue a Read Command 622 to a slave device 610, 612, 614, 616, 618 that directly or indirectly identifies the address of one or more registers to be read. The slave device 610, 612, 614, 616, 618 transmits a data stream 628 to the master device 602 over the serial bus 604, where the data stream 628 includes the content of the one or more registers. Such Register-Read operation initiated by the master device 602 involves a bus turn-around, whereby transmissions over the serial bus 604 transition from a Master-to-Slave direction 606 to a Slave-to-Master direction 608. The slave device 610, 612, 614, 616, 618 may not be capable of launching the data stream 628 on the data line of the serial bus 604 for some interval of time 624 after completion of the Read Command 622. The slave device 610, 612, 614, 616, 618 may be configured with a bus turn-around wait period 626 that determines when the slave device 610, 612, 614, 616, 618 responds to the Read Command 622. The master device 602 may monitor the serial bus 604 for activity during the bus turn-around wait period 626, before determining that the slave device 610, 612, 614, 616, 618 has not responded. The master device 602 continues to drive the clock line of the serial bus 604 when the slave device 610, 612, 614, 616, 618 is transmitting and during the bus turn-around wait period 626.

Conventionally, the bus turn-around wait period 626 is set to a fixed number of clock cycles for all slave devices 610, 612, 614, 616, 618 coupled to the serial bus 604. The bus turn-around wait period 626 can be too short for some slave devices 610, 612, 614, 616, 618, and can be longer than needed for other slave devices 610, 612, 614, 616, 618. Accordingly, the duration of bus turn-around wait period 626 is typically selected to support all slave devices 610, 612, 614, 616, 618 at the expense of bus throughput associated with better performing slave devices 610, 612, 614, 616, 618.

Figure 7:
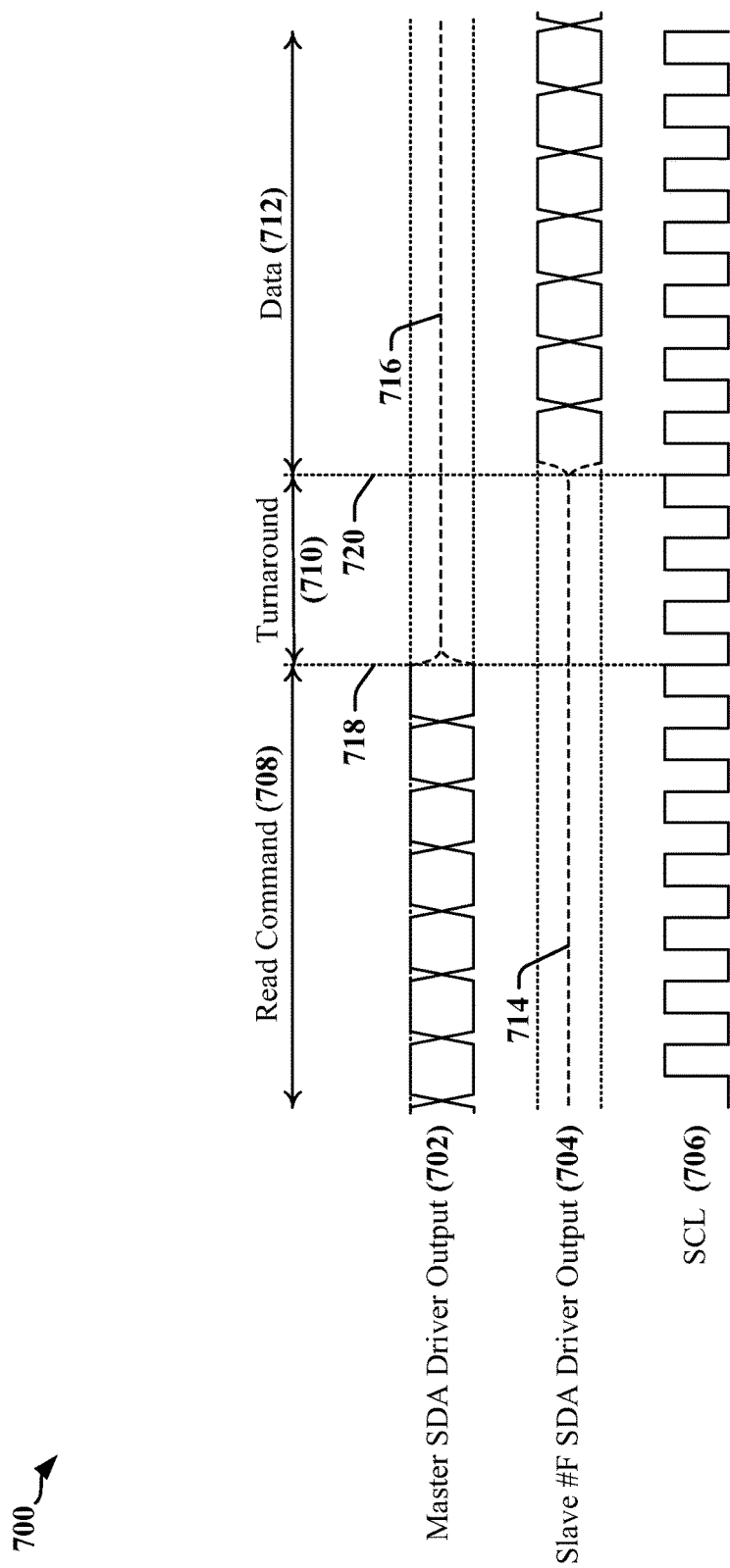
FIG. 7 illustrates an example of bus turnaround timing that may be adapted according to certain aspects disclosed herein.

FIG. 7 illustrates an example of bus turnaround timing 700. A master device may set the value of the bus turnaround period 710 at 3 cycles of a clock signal transmitted on the SCL line 706 of the serial bus 604. The clock signal controls transmissions on the serial bus. In a conventional system, the master device may fix the value of the bus turnaround period 710 at 3 clock cycles for all slave devices 610, 612, 614, 616, 618. The selection of the bus turnaround period 710 reflects the maximum bus turn-around wait period required (e.g. the period required by the slowest slave device 618 in FIG. 6. Some slave devices 610, 612, 614, 616 operate sub-optimally when the bus turnaround period 710 is set to 3 clock cycles. If the bus turnaround period 710 is set to 1 clock cycles, certain slave devices 610, 612, 616 operate optimally, while other slave devices 614, 618 may fail.

In the example illustrated by FIG. 7, the output 702 of a line driver that couples the master device 602 to the SDA line is active in a first period of time 708 during which the Read Command 622 is transmitted. At the commencement 718 of the bus turnaround period 710, the output 702 of the master SDA line driver is disabled and may enter a high impedance mode 716. A pullup resistor to keeper circuit may be employed to pull the SDA line to a preferred state, or the SDA line may float to an intermediate quiescent level. At the end 720 of the bus turnaround period 710, the output 704 of the slave SDA line driver is enabled causing the slave SDA line driver to exit a high impedance mode 714 and begin driving a data signal on the SDA line during the data transmission period 712.

According to certain aspects disclosed herein, a master device 602 may be adapted to set an individualized bus turnaround period 710 for each active slave device 610, 612, 614, 616, 618 coupled to the serial bus 604. System performance may be optimized when each slave device 610, 612, 614, 616, 618 is configured with a bus turnaround period 710 that closely matches its turn-around capability. The bus turn-around wait period 626 may be uniquely and optimally set for each active slave device 610, 612, 614, 616, 618 coupled to the serial bus 604 across possible variations of PVT and for one or more operating frequency ranges.

Figure 8:
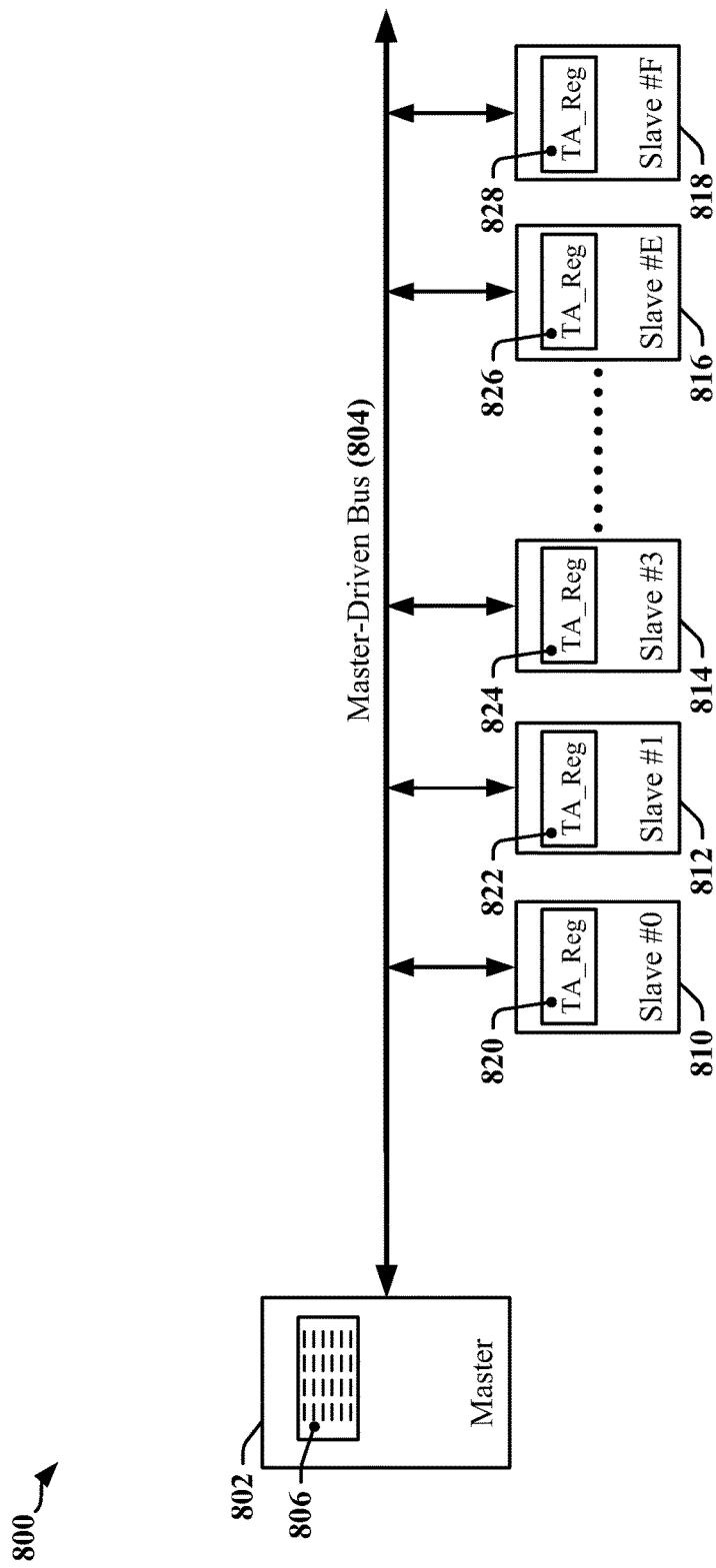
FIG. 8 illustrates a system that has been adapted to configure turn-around-wait-cycles in accordance with certain aspects disclosed herein.

FIG. 8 illustrates a system 800 that has been adapted to configure turn-around-wait-cycles in accordance with certain aspects disclosed herein. A master device 802 may be coupled through a serial bus 804 to multiple slave devices 810, 812, 814, 816, 818. The master device 802 may initially write a selected value in a register location 820, 822, 824, 826, 828 in each slave device 810, 812, 814, 816, 818. The master device 802 may then commence a turn-around wait-cycle configuration procedure for each slave device 810, 812, 814, 816, 818.

The master device 802 may initially configure the minimum bus turn-around wait period. In one example, the master device 802 may attempt to read the selected value from the register location 820 from a first slave device 810. If the selected value is successfully read from the register location 820, the master device 802 may store the minimum bus turn-around wait period value for use in all subsequent read operations with the first slave device 810. If the selected value is not successfully read from the register location 820, the master device 802 may incrementally increase the bus turn-around wait period value and re-attempt the read operation. The bus turn-around wait period value may be incremented until process continues until the selected value can be repeatedly read from register location 820 in the first slave device 810 successfully. The master device 802 may store the turn-around wait period value that enables successful reads for use in all subsequent read operations with the first slave device 810. The master device 802 may determine turn-around wait period values for each of the slave devices 810, 812, 814, 816, 818. These values may be stored in a look-up table 806 in the master device 802.

In certain examples, one or more slave devices 810, 812, 814, 816, 818 may be operable at different bus frequencies, and different turn-around wait period values may be determined for the different operating frequencies. The master device 802 may establish the turn-around wait period values for all operating frequencies separately and may maintain these values in the look-up table 806 for subsequent usage.

In certain examples, one or more slave devices 810, 812, 814, 816, 818 may be operable at different bus voltages, and different turn-around wait period values may be determined for the different operating voltages. The master device 802 may establish the turn-around wait period values for all operating voltages separately and may maintain these values in the look-up table 806 for subsequent usage.

The master device 802 may create and/or maintain a look-up table 806 across the possible variations of PVT and for all operating frequencies. The master device 802 may use the look-up table 806 to enable dynamic turn-around wait period configuration. The master device 802 may determine current operational conditions and/or characteristics and select appropriate dynamic turn-around wait periods from the master device 802. Each slave device 810, 812, 814, 816, 818 receives its respective appropriate turn-around wait period through a write operation. In one example, the master device 802 may write a new turn-around wait period to one or more slave devices 810, 812, 814, 816, 818 before causing the serial bus 804 to be operated in a different mode, such as a higher frequency.

In some instances, the look-up table 806 of the master device 802 may be configured during manufacturing, where the look-up table 806 is populated with values obtained from product testing. The look-up table 806 may be configured or reconfigured by the master device 802 during system initialization and/or during normal operation. In one example, the master device 802 may reconfigure the look-up table 806 after detecting multiple and/or repeated errors when communicating with a slave device 810, 812, 814, 816, 818.

Dynamic Configuration of Turn-Around Wait Period

Figure 9:
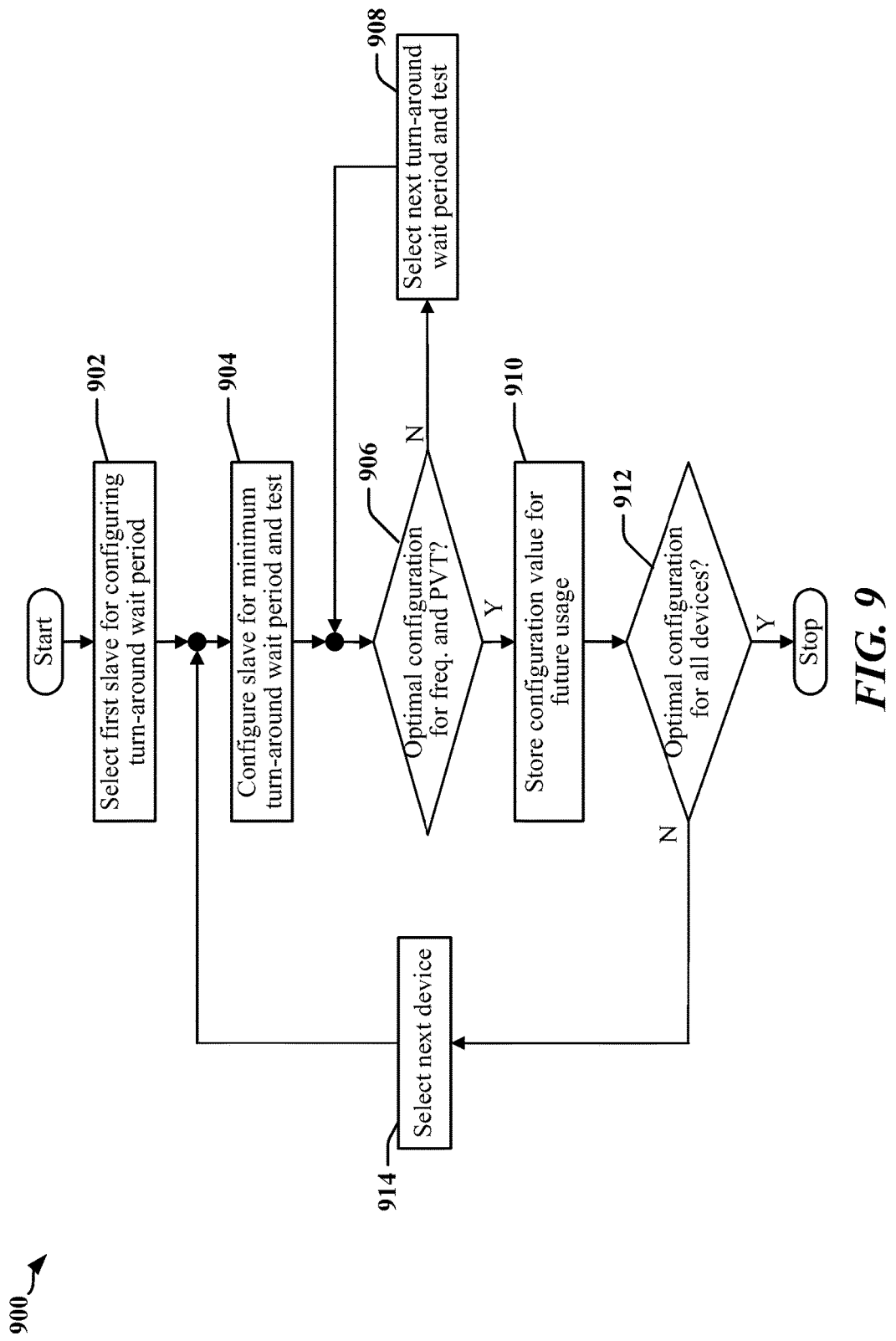
FIG. 9 illustrates an example of a procedure that may be performed to dynamically determine turn-around wait period values in accordance with certain aspects disclosed herein.

FIG. 9 illustrates an example of a procedure 900 that may be performed to dynamically configure a look-up table 806 with turn-around wait period values for one or more slave devices 810, 812, 814, 816, 818. The procedure 900 may be performed to populate a look-up table 806 in a master device 802. In some instances, the look-up table 806 may initially include no empirical turn-around wait period values, and/or may be initialized to a minimum turn-around wait period value. In other instances, the look-up table 806 may initially include turn-around wait period values configured during manufacture, and/or one or more turn-around wait period values configured during a previous execution of the procedure 900.

At block 902, the master device 802 may select a first of the slave devices 810, 812, 814, 816, 818 for configuration. In one example, the master device 802 may configure devices in an order determined by addresses of the slave devices 810, 812, 814, 816, 818 coupled to the serial bus 804. The master device 802 may have determined the addresses of active slave devices 810, 812, 814, 816, 818 that are coupled to the serial bus 804. In some instances, the master device 802 may be preconfigured with addresses of active slave devices 810, 812, 814, 816, 818 that are coupled to the serial bus 804.

At block 904, the master device 802 may configure the selected slave device 810, 812, 814, 816, 818 for a minimum turn-around wait period value. The master device 802 may store a test value in a register of the selected slave device 810, 812, 814, 816, 818. The master device 802 may issue a read command to read the test value from the register of the selected slave device 810, 812, 814, 816, 818. If the test value is successfully read, then the master device 802 may repeat the test for a preconfigured number of times.

At block 906, the master device 802 may determine whether the test value has been successfully read a sufficient number of times to determine that the selected slave device 810, 812, 814, 816, 818 is optimally configured for the current operating conditions (e.g., PVT, frequency, etc.). If the selected slave device 810, 812, 814, 816, 818 is determined to be optimally configured the procedure continues at block 910. If the selected slave device 810, 812, 814, 816, 818 is not determined to be optimally configured the procedure continues at block 908.

At block 908, the master device 802 may configure the selected slave device 810, 812, 814, 816, 818 with a next turn-around wait period value. The next turn-around wait period value may be incrementally greater than the minimum turn-around wait period value.

At block 910, the master device 802 may store the current turn-around wait period value at which the selected slave device 810, 812, 814, 816, 818 is determined to be optimally configured. The master device 802 may store the current turn-around wait period value in the look-up table 806. The current turn-around wait period value may be stored in the look-up table 806 at a location that may indexed by PVT, frequency, etc.

At block 912, the master device 802 may determine if all slave devices 810, 812, 814, 816, 818 have been configured. If all slave devices 810, 812, 814, 816, 818 have not been configured, the procedure continues at block 914. If all slave devices 810, 812, 814, 816, 818 have been configured the procedure may terminate.

At block 914, the master device 802 may select another slave device 810, 812, 814, 816, 818 for configuration. The procedure then resumes at block 904.

The procedure 900 may be repeated for different PVT and/or frequency conditions. In some instances, each slave device 810, 812, 814, 816, 818 is configured for multiple PVT and/or frequency conditions before a next slave device 810, 812, 814, 816, 818 is configured at 914.

Figure 10:
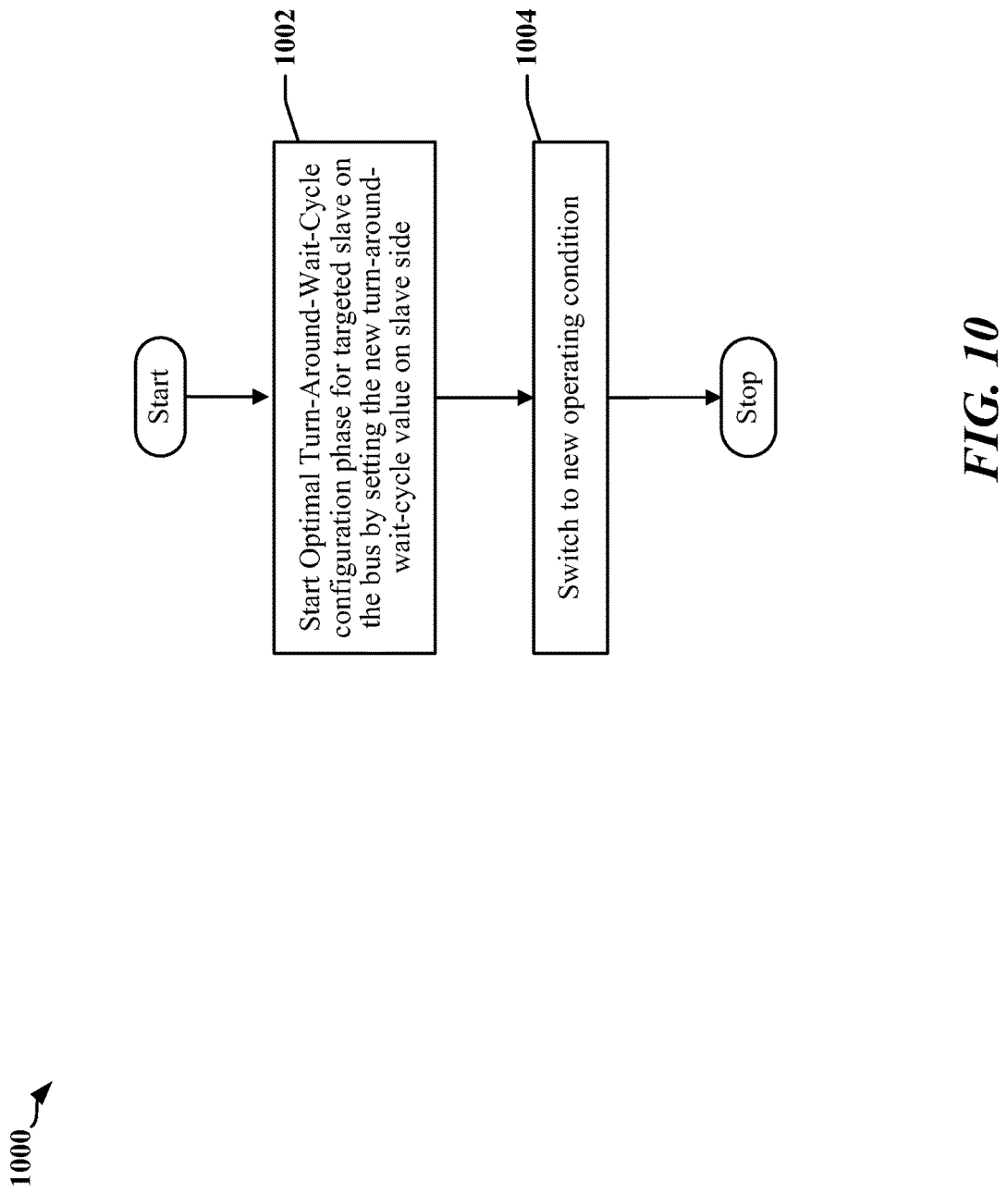
FIG. 10 is a first flowchart that illustrates an example of a process that may be performed to dynamically configure slave devices with an optimal turn-around wait period value in accordance with certain aspects disclosed herein.

FIG. 10 illustrates an example of a process 1000 that may be performed to dynamically configure one or more slave devices 810, 812, 814, 816, 818 for an optimal turn-around wait period value. The process 1000 may be performed before causing a change in mode of operation of the serial bus 804, for example. The process 1000 may be performed after detecting a change in PVT, bus operating frequency, and/or mode of operation of the serial bus 804, for example. A master device 802 may maintain a look-up table 806 that includes turn-around wait period values.

At block 1002, the master device 802 may write optimal turn-around wait period values to one or more slave devices 810, 812, 814, 816, 818. In one example, the master device 802 may configure devices in an order determined by addresses of the slave devices 810, 812, 814, 816, 818 coupled to the serial bus 804.

At block 1004, the master device 802 may cause a change in mode of operation for the serial bus 804.

Examples of Processing Circuits and Methods

Figure 11:
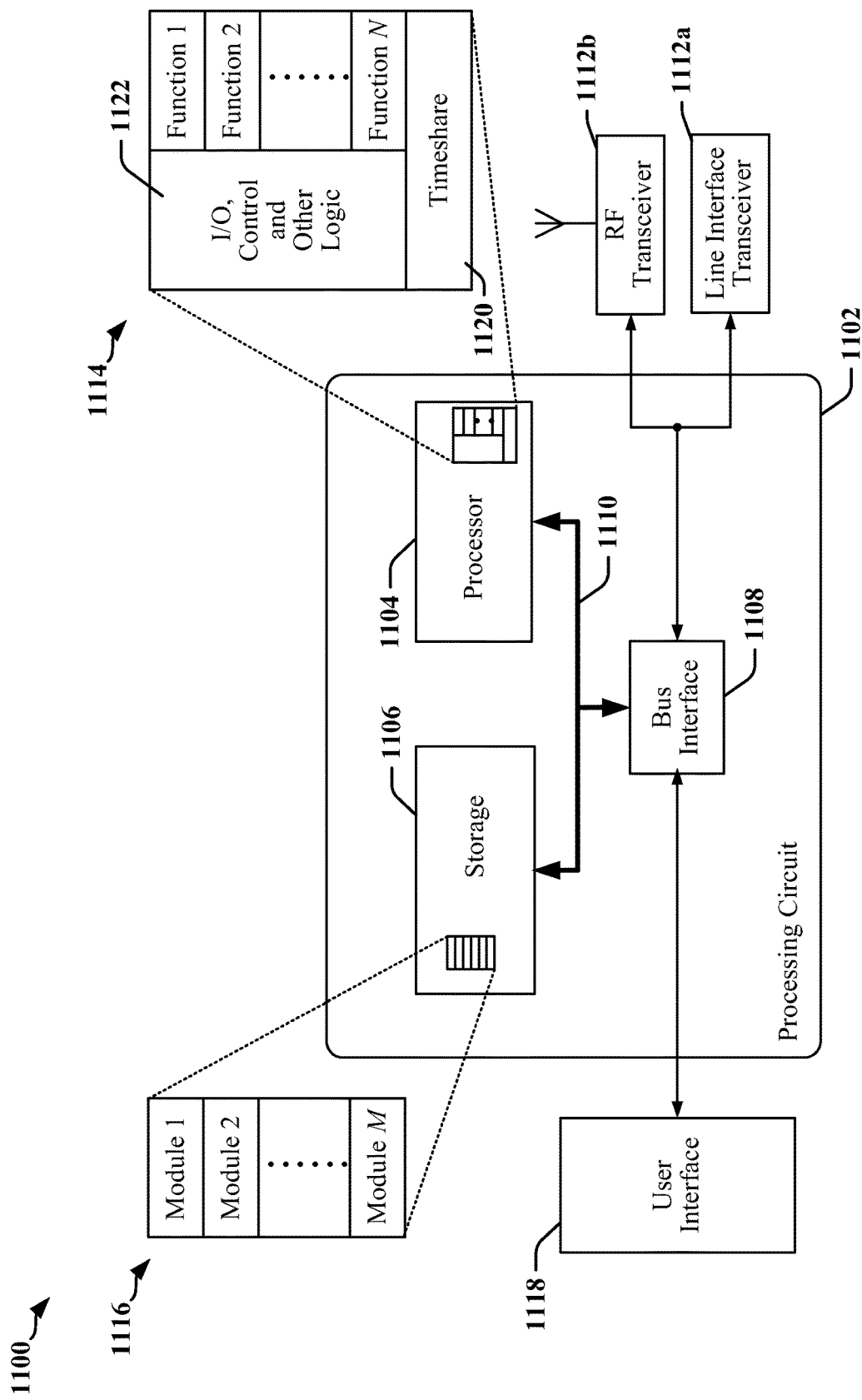
FIG. 11 is a diagram illustrating an example of an apparatus employing a processing circuit that may be adapted according to certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceivers 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceivers 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceivers 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 12:
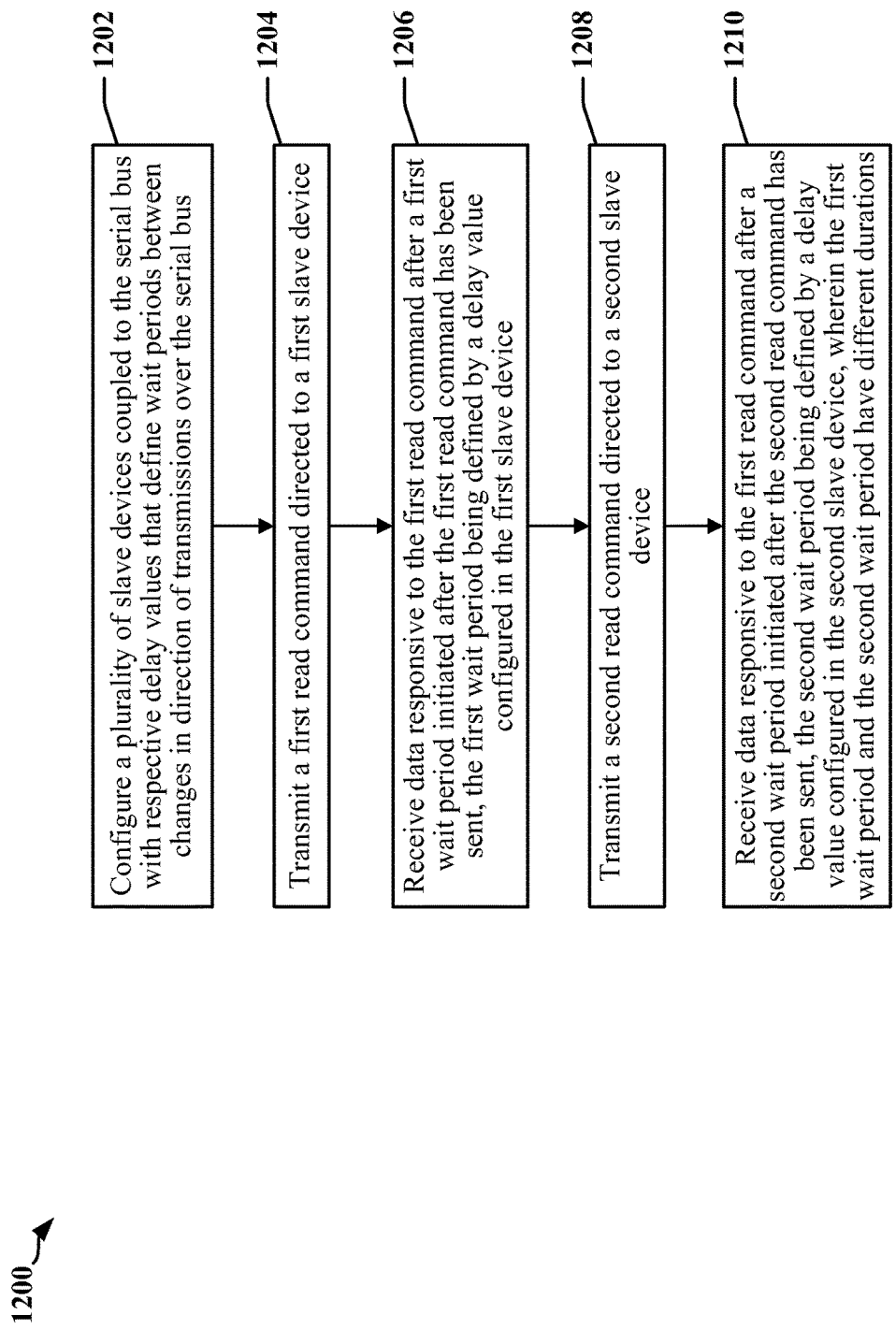
FIG. 12 is a third flowchart that illustrates certain aspects disclosed herein.

FIG. 12 is a flowchart 1200 of a method that may be performed at a master device coupled to a serial bus.

At block 1202, the master device may configure a plurality of slave devices coupled to the serial bus with respective delay values that define wait periods between changes in direction of transmissions over the serial bus.

At block 1204, the master device may transmit a first read command directed to a first slave device.

At block 1206, the master device may receive data responsive to the first read command after a first wait period initiated after the first read command has been sent. The first wait period may be defined by a delay value configured in the first slave device.

At block 1208, the master device may transmit a second read command directed to a second slave device.

At block 1210, the master device may receive data responsive to the first read command after a second wait period initiated after the second read command has been sent. The second wait period may be defined by a delay value configured in the second slave device. The first wait period and the second wait period may have different durations.

In various examples, the method may include transmitting first data to a register in a third slave device, initializing a first delay value, repeating a test procedure until the first data is correctly read from the third slave device. The test procedure may include transmitting the first delay value to the third slave device, transmitting a third read command addressed to the register in the third slave device, and increasing the first delay value when the first data is not correctly read from the third slave device. The third slave device may be configured to use the first delay value to define wait periods between changes in direction of transmissions over the serial bus. The first delay value may be used to define changes in direction of transmissions over the serial bus when the serial bus is operated in a first mode for communication with the third slave device.

In some examples, the method includes determining occurrence of a change in mode of operation of the serial bus, transmitting second data to a register in the third slave device, initializing a second delay value, and repeating a test procedure until the second data is correctly read from the third slave device. The test procedure may include transmitting the second delay value to the third slave device, transmitting the third read command on the serial bus, and increasing the second delay value when the second data is not correctly read from the third slave device. The third slave device may be configured to use the second delay value to define wait periods between changes in direction of transmissions over the serial bus. The second delay value may be used to define changes in direction of transmissions over the serial bus when the serial bus is operated in a second mode for communication with the third slave device.

In certain examples, the serial bus is operated in the second mode when frequency of a clock signal is changed. The occurrence of a change in mode of operation of the serial bus may be determined by identifying a variation in PVT characteristics affecting the third slave device.

In various examples, the first delay value may be stored in a table of delay values that includes delay values indexed by process, voltage and/or temperature. The first delay value may be stored in a table of delay values that includes delay values indexed by frequency. The first delay value may be stored in a table of delay values that includes delay values indexed by slave device.

Figure 13:
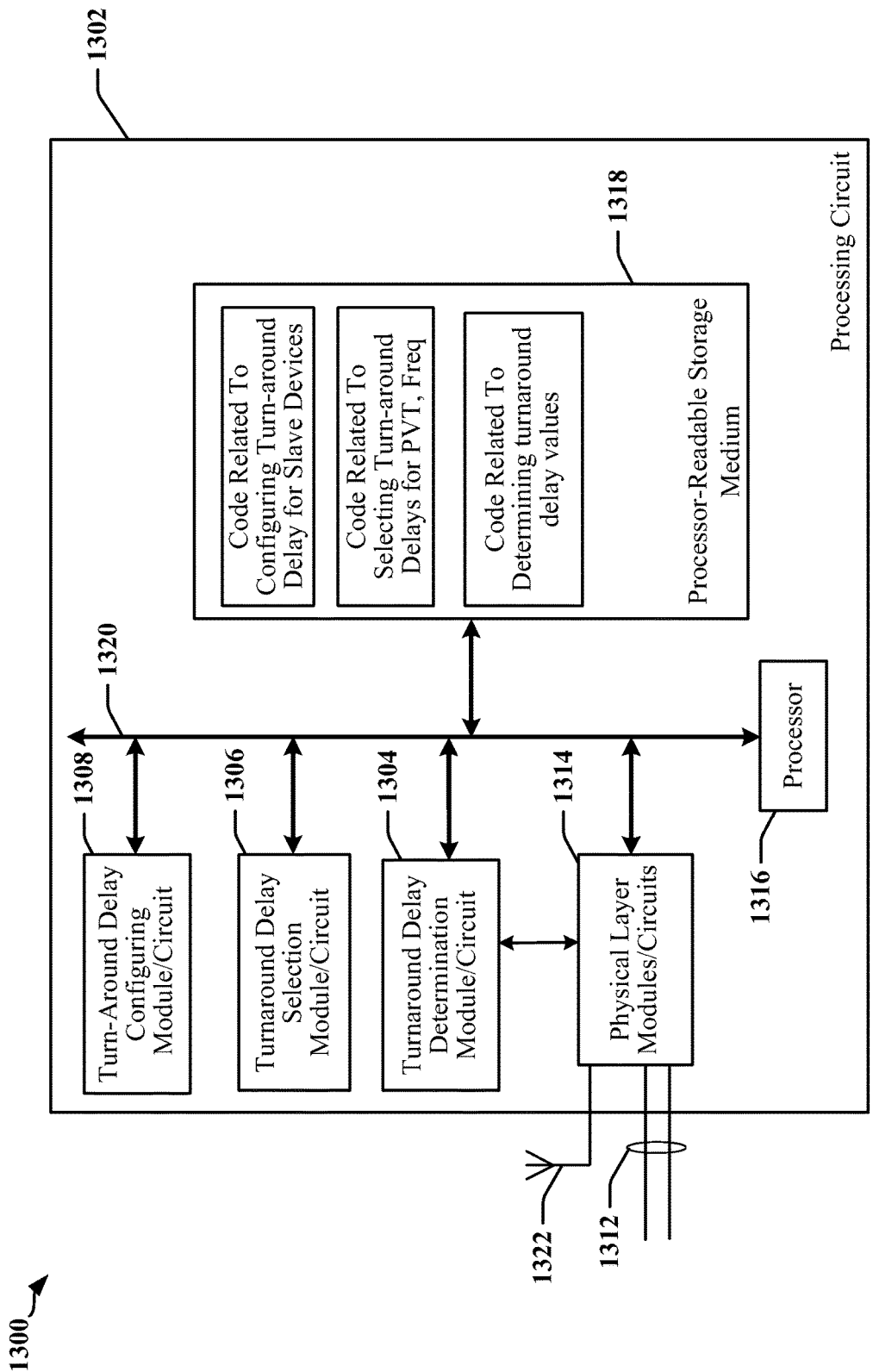
FIG. 13 illustrates an example of a hardware implementation for an apparatus adapted in accordance with certain aspects disclosed herein.

FIG. 13 is a diagram illustrating a simplified example of a hardware implementation for an apparatus 1300 employing a processing circuit 1302. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308, and the processor-readable storage medium 1318. One or more physical layer circuits and/or modules 1314 may be provided to support communications over a communication link implemented using a multi-wire bus 1312, through an antenna 1322 (to a radio access network for example), and so on. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The processor-readable storage medium may include a non-transitory storage medium. The software, when executed by the processor 1316, causes the processing circuit 1302 to perform the various functions described supra for any particular apparatus. The processor-readable storage medium may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 adapted to configure turn-around delay values in one or more slave devices, modules and/or circuits 1306 adapted to select turn-around delay values for one or more slave devices based on operating conditions and/or desired modes of operation, and modules and/or circuits 1304 adapted to determine or calculate turn-around delay values for one or more slave devices.

For example, the apparatus 1300 may include means for configuring a plurality of slave devices coupled to the serial bus with respective delay values that define wait periods between changes in direction of transmissions over the serial bus, means for transmitting a first read command directed to a first slave device, means for receiving data responsive to the first read command after a first wait period initiated after the first read command has been sent, the first wait period being defined by a delay value configured in the first slave device, means for transmitting a second read command directed to a second slave device, and means for receiving data responsive to the first read command after a second wait period initiated after the second read command has been sent, the second wait period being defined by a delay value configured in the second slave device. The first wait period and the second wait period may have different durations.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a bus master device, comprising:

configuring a plurality of slave devices coupled to a serial bus with respective delay values that define wait periods between changes in direction of transmissions over the serial bus;

transmitting a first read command directed to a first slave device;

receiving data responsive to the first read command after a first wait period initiated after the first read command has been sent, the first wait period being defined by a delay value configured in the first slave device;

transmitting a second read command directed to a second slave device; and receiving data responsive to the second read command after a second wait period initiated after the second read command has been sent, the second wait period being defined by a delay value configured in the second slave device, wherein the first wait period and the second wait period have different durations.

2. The method of claim 1, further comprising:

transmitting first data to a register in a third slave device;

initializing a first delay value;

repeating, until the first data is correctly read from the third slave device:

transmitting the first delay value to the third slave device, wherein the third slave device is configured to use the first delay value to define wait periods between changes in direction of transmissions over the serial bus;

transmitting a third read command addressed to the register in the third slave device; and increasing the first delay value when the first data is not correctly read from the third slave device; and using the first delay value to define a third wait period associated with changes in direction of transmissions over the serial bus when the serial bus is operated in a first mode for communication with the third slave device.

3. The method of claim 2, further comprising:

determining occurrence of a change in mode of operation of the serial bus;

transmitting second data to a register in the third slave device;

initializing a second delay value;

repeating, until the second data is correctly read from the third slave device:

transmitting the second delay value to the third slave device, wherein the third slave device is configured to use the second delay value to define wait periods between changes in direction of transmissions over the serial bus;

transmitting the third read command on the serial bus; and increasing the second delay value when the second data is not correctly read from the third slave device; and using the second delay value to define a fourth wait period associated with changes in direction of transmissions over the serial bus when the serial bus is operated in a second mode for communication with the third slave device.

4. The method of claim 3, wherein the serial bus is operated in the second mode when frequency of a clock signal is changed.

5. The method of claim 3, wherein determining the occurrence of the change in mode of operation of the serial bus comprises:
identifying a variation in process, voltage and temperature (PVT) characteristics affecting the third slave device.

6. The method of claim 2, further comprising:
storing the first delay value in a table of delay values that includes delay values indexed by process, voltage and/or temperature.

7. The method of claim 2, further comprising:
storing the first delay value in a table of delay values that includes delay values indexed by frequency.

8. The method of claim 2, further comprising:
storing the first delay value in a table of delay values that includes delay values indexed by slave device.

9. A non-transitory processor-readable storage medium having one or more instructions which, when executed by at least one processor or state machine of a processing circuit, cause the processing circuit to:
configure a plurality of slave devices coupled to a serial bus with respective delay values that define wait periods between changes in direction of transmissions over the serial bus;
transmit a first read command directed to a first slave device;
receive data responsive to the first read command after a first wait period initiated after the first read command has been sent, the first wait period being defined by a delay value configured in the first slave device;
transmit a second read command directed to a second slave device; and
receive data responsive to the second read command after a second wait period initiated after the second read command has been sent, the second wait period being defined by a delay value configured in the second slave device,
wherein the first wait period and the second wait period have different durations.

10. The non-transitory processor-readable storage medium of claim 9, wherein the instructions further cause the processing circuit to:
transmit first data to a register in a third slave device;
initialize a first delay value;
repetitively, until the first data is correctly read from the third slave device:
transmit the first delay value to the third slave device, wherein the third slave device is configured to use the first delay value to define wait periods between changes in direction of transmissions over the serial bus;
transmit a third read command addressed to the register in the third slave device; and
increase the first delay value when the first data is not correctly read from the third slave device; and use the first delay value to define a third wait period associated with changes in direction of transmissions over the serial bus when the serial bus is operated in a first mode for communication with the third slave device.

11. The non-transitory processor-readable storage medium of claim 10, wherein the instructions further cause the processing circuit to:
determine occurrence of a change in mode of operation of the serial bus;
transmit second data to a register in the third slave device;
initialize a second delay value; and
repetitively, until the second data is correctly read from the third slave device:
transmit the second delay value to the third slave device, wherein the third slave device is configured to use the second delay value to define wait periods between changes in direction of transmissions over the serial bus;
transmit the third read command on the serial bus; and
increase the second delay value when the second data is not correctly read from the third slave device; and
use the second delay value to define a fourth wait period associated with changes in direction of transmissions over the serial bus when the serial bus is operated in a second mode for communication with the third slave device.

12. The non-transitory processor-readable storage medium of claim 11, wherein the serial bus is operated in the second mode when frequency of a clock signal is changed.

13. The non-transitory processor-readable storage medium of claim 11, wherein the instructions further cause the processing circuit to:
identify a variation in process, voltage and temperature (PVT) characteristics affecting the third slave device.

14. The non-transitory processor-readable storage medium of claim 10, wherein the instructions further cause the processing circuit to:
store the first delay value in a table of delay values that includes delay values indexed by process, voltage and/or temperature.

15. The non-transitory processor-readable storage medium of claim 10, wherein the instructions further cause the processing circuit to:
store the first delay value in a table of delay values that includes delay values indexed by frequency.

16. The non-transitory processor-readable storage medium of claim 10, wherein the instructions further cause the processing circuit to:
store the first delay value in a table of delay values that includes delay values indexed by slave device.

17. An apparatus comprising:
means for configuring a plurality of slave devices coupled to a serial bus with respective delay values that define wait periods between changes in direction of transmissions over the serial bus;
means for transmitting commands on the serial bus, the means for transmitting commands being configured to transmit a first read command directed to a first slave device; and
means for receiving data from the serial bus, the means for receiving data being configured to receive data responsive to the first read command after a first wait period initiated after the first read command has been sent, the first wait period being defined by a delay value configured in the first slave device, wherein the means for transmitting commands is further configured to transmit a second read command directed to a second slave device, wherein the means for receiving data is further configured to receive data responsive to the second read command after a second wait period initiated after the second read command has been sent, the second wait period being defined by a delay value configured in the second slave device, and wherein the first wait period and the second wait period have different durations.

18. The apparatus of claim 17, further comprising:
means for determining delay values configured to determine a first delay value operable to define a third wait period associated with changes in direction of transmissions over the serial bus when the serial bus is operated in a first mode for communication with a third slave device, wherein the means for determining delay values is further configured to:
transmit first data to a register in the third slave device;
initialize the first delay value; and
repetitively, until the first data is correctly read from the third slave device:
  transmit the first delay value to the third slave device, wherein the third slave device is configured to use the first delay value to define wait periods between changes in direction of transmissions over the serial bus;
  transmit a third read command addressed to the register in the third slave device; and
  increase the first delay value when the first data is not correctly read from the third slave device.

19. The apparatus of claim 18, wherein the means for determining delay values is further configured to determine a second delay value operable to define a fourth wait period associated with changes in direction of transmissions over the serial bus when the serial bus is operated in a second mode for communication with the third slave device, and wherein the means for determining delay values is further configured to:
  determine occurrence of a change in mode of operation of the serial bus;
  transmit second data to a register in the third slave device;
  initialize the second delay value; and
  repetitively, until the second data is correctly read from the third slave device:
    transmit the second delay value to the third slave device, wherein the third slave device is configured to use the second delay value to define wait periods between changes in direction of transmissions over the serial bus;
    transmit the third read command on the serial bus; and
    increase the second delay value when the second data is not correctly read from the third slave device.

20. The apparatus of claim 19, wherein the serial bus is operated in the second mode when frequency of a clock signal is changed.

21. The apparatus of claim 19, wherein the means for determining delay values is further configured to:
  identify a variation in process, voltage and temperature (PVT) characteristics affecting the third slave device.

22. The apparatus of claim 18, further comprising:
means for storing the first delay value in a table of delay values that includes delay values indexed by process, voltage and/or temperature.

23. The apparatus of claim 18, further comprising:
means for storing the first delay value in a table of delay values that includes delay values indexed by frequency.

24. The apparatus of claim 18, further comprising:
means for storing the first delay value in a table of delay values that includes delay values indexed by slave device.

25. A bus master comprising:
a bus interface that couples the bus master to a multi-drop bus;
a storage device configured with a look-up table that maintains one or more bus turnaround delay values for each of a plurality of slave devices coupled to the multi-drop bus; and
a controller configured to:
  configure each of the plurality of slave devices with respective one or more bus turnaround delay values maintained in the storage device, wherein each turnaround delay value defines a wait period between changes in direction of transmissions over the multi-drop bus;
  transmit a first read command directed to a first slave device;
  receive data responsive to the first read command after a first wait period initiated after the first read command has been sent, the first wait period being defined by a first turnaround delay value configured in the first slave device;
  transmit a second read command directed to a second slave device; and
  receive data responsive to the second read command after a second wait period initiated after the second read command has been sent, the second wait period being defined by a second turnaround delay value configured in the second slave device,
  wherein the first wait period and the second wait period have different durations.

26. The bus master of claim 25, wherein the controller is further configured to:
  transmit first data to a register in a third slave device;
  initialize a first delay value; and
  repetitively, until the first data is correctly read from the third slave device:
    transmit the first delay value to the third slave device, wherein the third slave device is configured to use the first delay value to define wait periods between changes in direction of transmissions over the multi-drop bus;
    transmit a third read command addressed to the register in the third slave device; and
    increase the first delay value when the first data is not correctly read from the third slave device.

27. The bus master of claim 26, wherein the controller is further configured to:
  determine occurrence of a change in mode of operation of the multi-drop bus;
  transmit second data to a register in the third slave device;
  initialize a second delay value; and
  repetitively, until the second data is correctly read from the third slave device:
    transmit the second delay value to the third slave device, wherein the third slave device is configured to use the second delay value to define wait periods between changes in direction of transmissions over the multi-drop bus;
    transmit the third read command on the multi-drop bus; and increase the second delay value when the second data is not correctly read from the third slave device.

28. The bus master of claim 27, wherein the change in mode of operation corresponds to a change in frequency of a clock signal that controls transmissions over the multi-drop bus.

29. The bus master of claim 27, wherein the change in mode of operation corresponds to a variation in process, voltage and temperature (PVT) characteristics affecting the third slave device.

30. The bus master of claim 25, wherein the one or more bus turnaround delay values in the look-up table are indexed by voltage, temperature and/or frequency of a clock signal transmitted on the multi-drop bus.

* * * * *